(12) United States Patent
Schiele

(10) Patent No.: US 12,203,422 B2
(45) Date of Patent: Jan. 21, 2025

(54) VEHICLE WITH FUEL DENSIFIER

(71) Applicant: DELTA LABORATORIES HOLDING B.V., Rotterdam (NL)

(72) Inventor: André Schiele, Warmond (NL)

(73) Assignee: DELTA LABORATORIES HOLDING B.V., Rotterdam (NL)

( * ) Notice: Subject to any disclaimer, the term of this patent is extended or adjusted under 35 U.S.C. 154(b) by 569 days.

(21) Appl. No.: 17/601,177

(22) PCT Filed: Apr. 6, 2020

(86) PCT No.: PCT/NL2020/050233
§ 371 (c)(1),
(2) Date: Oct. 4, 2021

(87) PCT Pub. No.: WO2020/204721
PCT Pub. Date: Oct. 8, 2020

(65) Prior Publication Data
US 2022/0186672 A1 Jun. 16, 2022

(30) Foreign Application Priority Data

Apr. 5, 2019 (NL) ...................................... 2022883

(51) Int. Cl.
*F02D 19/06* (2006.01)
*B01D 61/02* (2006.01)
(Continued)

(52) U.S. Cl.
CPC ....... *F02D 19/0671* (2013.01); *B01D 61/025* (2013.01); *B01D 61/364* (2013.01);
(Continued)

(58) Field of Classification Search
CPC ... B01D 61/364; B01D 61/366; B01D 61/368
See application file for complete search history.

(56) References Cited

U.S. PATENT DOCUMENTS 2,992,638 A 7/1961 Bloom, Jr. et al.
3,383,174 A 5/1968 Carnine et al.
(Continued)

FOREIGN PATENT DOCUMENTS

CN 1823004 A 8/2006
CN 101445757 A 6/2009
(Continued)

OTHER PUBLICATIONS

International Search Report and Written Opinion for corresponding International application No. PCT/NL2020/050233; dated Jun. 4, 2020 (11 pages).
(Continued)

*Primary Examiner* — Brian L Swenson
(74) *Attorney, Agent, or Firm* — Mendelsohn Dunleavy, PC

(57) ABSTRACT

For powering a vehicle, a high energy density fuel is preferred. However, for example when the high energy fuel is highly concentrated hydrogen peroxide, this fuel may be dangerous to handle; especially when the person handling the fuel is a normal consumer filling a fuel reservoir of his vehicle at a gas station. The present invention therefore provides a vehicle arranged to receive a diluted—and thus safer—fuel, and to density this fuel to a concentrated fuel in low quantities on board for direct use. To this end a fuel densifier is provided in the vehicle arranged for receiving liquid diluted fuel and arranged to provide a concentrated fuel based on the diluted fuel, the concentrated fuel having a higher energy density than the diluted fuel. A power conversion module of the vehicle is arranged to convert the concentrated fuel to kinetic energy for powering the vehicle.

17 Claims, 3 Drawing Sheets

(51) Int. Cl.
  B01D 61/36    (2006.01)
  B01D 61/58    (2006.01)
  B01D 69/02    (2006.01)
  C01B 15/013   (2006.01)
  F01D 15/12    (2006.01)
  F02M 37/00    (2006.01)
  F02M 37/24    (2019.01)
  F02M 37/30    (2019.01)
  F02M 37/34    (2019.01)

(52) U.S. Cl.
  CPC ......... *B01D 61/366* (2013.01); *B01D 61/368* (2013.01); *B01D 61/58* (2013.01); *B01D 69/02* (2013.01); *C01B 15/013* (2013.01); *F01D 15/12* (2013.01); *F02D 19/0605* (2013.01); *F02D 19/0607* (2013.01); *F02D 19/0639* (2013.01); *F02D 19/0665* (2013.01); *F02M 37/0011* (2013.01); *F02M 37/0088* (2013.01); *F02M 37/24* (2019.01); *F02M 37/30* (2019.01); *F02M 37/34* (2019.01); *B01D 2311/1032* (2022.08); *B01D 2311/106* (2013.01); *B01D 2311/14* (2013.01); *B01D 2311/2626* (2013.01); *B01D 2311/2649* (2013.01); *B01D 2311/2669* (2013.01); *B01D 2311/2676* (2013.01); *B01D 2325/38* (2013.01)

(56) References Cited

U.S. PATENT DOCUMENTS

| | | | |
|---|---|---|---|
| 4,182,278 A | 1/1980 | Coakwell | |
| 6,097,164 A | 8/2000 | DeRosa | |
| 6,255,009 B1 | 7/2001 | Rusek et al. | |
| 6,290,820 B1* | 9/2001 | Carden | B01D 3/34 203/13 |
| 2002/0068035 A1 | 6/2002 | Nordhoff et al. | |
| 2004/0110046 A1* | 6/2004 | Pan | H01M 8/04201 429/449 |
| 2006/0204803 A1* | 9/2006 | Yamaguchi | H01M 8/04186 429/429 |
| 2006/0260193 A1 | 11/2006 | Ryan et al. | |
| 2006/0292421 A1* | 12/2006 | Hirayama | H01M 8/04194 429/410 |
| 2007/0079816 A1 | 4/2007 | White et al. | |
| 2007/0084423 A1 | 4/2007 | LeBeaux | |
| 2013/0000596 A1* | 1/2013 | Diaz Escano | F02M 25/03 123/25 A |
| 2013/0175972 A1* | 7/2013 | Akiyama | H01M 8/04619 320/101 |
| 2017/0028348 A1* | 2/2017 | Hancock | C02F 1/385 |

FOREIGN PATENT DOCUMENTS

| | | |
|---|---|---|
| CN | 104891410 A | 9/2015 |
| DE | 102016214271 A1 | 2/2018 |
| GB | 1292046 A | 10/1972 |
| KR | 10-2008-0054554 A | 6/2008 |

OTHER PUBLICATIONS

Fukuzumi, Shunichi, et al. "Thermal and Photocatalytic Production of Hydrogen Peroxide and its Use in Hydrogen Peroxide Fuel Cells." Australian Journal of Chemistry 67.3 (2013): 354-364.

Hertl, W., et al. "Adsorption of Water on Silica." Nature 223.5211 (1969): 1150-1151.

Liu, Lumeng, et al. "Water adsorption on carbon—A review." Advances in Colloid and Interface Science 250 (2017): 64-78.

Mase, Kentaro, et al. "Seawater usable for production and consumption of hydrogen peroxide as a solar fuel." Nature Communications 7.11470 (2016): 1-7.

Titova, K. V., et al. "Methods for Concentration of Hydrogen Peroxide To Obtain It in Anhydrous Form." Russian Journal of Applied Chemistry 75.12 (2002): 1903-1906.

First Office Action for corresponding Chinese application No. 202080038601.5; dated Jul. 5, 2023 (30 pages) Machine Translation.

* cited by examiner

VEHICLE WITH FUEL DENSIFIER

TECHNICAL FIELD

The present invention relates to the field of vehicles powered by a liquid fuel.

BACKGROUND

Fuel providing energy for propelling vehicles has a relatively high energy density. The energy density of the fuel, mostly stored in chemical energy, is preferably as high as possible to provide a decent amount of energy to allow travel over a sufficiently long track with a sufficiently low volume. A person skilled in the art will optimize a vehicle to transport a fuel on-board the vehicle that has as much energy content in as little as possible volume. On the other hand, a high energy density provides a potentially unstable and therefore potentially dangerous substance that may be difficult or even perilous to handle.

Fossil fuels—hydrocarbons in particular—are relatively stable and provide a sufficiently high energy density. However, public opinion has turned against use of hydrocarbons due to the carbon dioxide that is produced by combustion of hydrocarbons, for which reason alternative fuels are being searched. Electrically powered vehicles using batteries are a known and proven alternative, but charging of the batteries may be slow. Hydrogen powered cars are named an alternative as well, but hydrogen is cumbersome and dangerous to handle.

U.S. Pat. No. 6,255,009B1 discloses a method for performing work comprising the steps of providing an impellant consisting essentially of hydrogen peroxide ($H_2O_2$) of a strength at least 85 mass percent of total impellent, decomposing the impellant, wherein the decomposition releases energy, and, directing the released energy to perform work. A power system having an impellent consisting essentially of hydrogen peroxide of a strength at least 85 mass percent of total impellant is disclosed. The work may provide environmental conditioning, such as heat and potable water.

U.S. Pat. No. 6,255,009B1 discloses that hydrogen peroxide can be produced on board of a vessel. For example, an electrolytic hydrogen peroxide producer can be used to convert seawater to medium strength hydrogen peroxide of 65%-85% by mass concentration.

After exiting the electrolytic hydrogen peroxide producer, the medium strength hydrogen peroxide either enters an $H_2O_2$ purifier to be purified to high strength hydrogen peroxide, or travels directly as medium strength hydrogen peroxide to be used within shipboard systems and/or machinery.

SUMMARY

It is preferred to provide a fuel system for a vehicle which can be provided directly with a diluted fuel having a relatively low risk. The fuel system is arranged to provide a concentrated fuel having a sufficiently high energy density to be provided to a reaction chamber of, for example, an engine or another power conversion unit like a fuel cell.

The term vehicle may refer to any means which may be used for travel or conveying of persons and/or goods. Examples of vehicles are land vehicles such as a car, motorcycle, truck, bicycle, water vehicles such as boats, ships, submarines, and air vehicles such as planes, rockets, and helicopters.

In a vehicle, energy from the diluted fuel may be used for moving the vehicle, for example for accelerating, braking, and/or changing a direction of movement. Furthermore, as an option, other energy demanding devices on a vehicle may be powered using the diluted fuel. Examples of energy demanding devices are climate conditioning devices such as heaters and air conditioners, cranes mounted to the vehicle for moving goods, and/or in general any other device comprised by the vehicle requiring energy to operate.

The terms concentrated and diluted refer to ratio's in a mixture of a reactive fuel compound having a first energy density and a carrier compound having a second energy density lower than the first energy density. The terms concentrated and diluted are within that context to be understood as relative to one another, rather than as absolute values of ratio's. For some fuel mixtures, a 65% concentration of fuel compound to the total amount of mixture may be concentrated, whereas it may be considered to be diluted for other fuel compounds. In the context of the various aspects discussed here and their embodiments, concentrated indicates a higher amount of reactive fuel compound relative to the carrier compound than diluted, the latter indicating a lower amount of reactive fuel compound relative to the carrier compound in the whole mixture.

A first aspect provides a vehicle, comprising a fuel reservoir for receiving and storing a liquid diluted fuel comprising a dilutor, a fuel densifier arranged for receiving liquid diluted fuel from the fuel reservoir and arranged to provide a concentrated fuel based on the diluted fuel, the concentrated fuel having a higher energy density than the diluted fuel, a power conversion module arranged to convert the concentrated fuel to kinetic energy, a propulsion structure for propelling the vehicle, and a drive train to transfer the kinetic energy from the power conversion module to the propulsion structure.

In the state of the art, for example in U.S. Pat. No. 6,255,009B1, no fuel reservoir for receiving and storing the liquid diluted fuel is provided. In particular, in U.S. Pat. No. 6,255,009B1, the medium strength hydrogen peroxide as the liquid diluted fuel either enters the purifier to be purified to high strength hydrogen peroxide, or is directly used within shipboard systems and/or machinery and is hence not stored in a fuel reservoir.

In the state of the art, furthermore, when hydrogen peroxide is stored in a fuel reservoir, it is stored at a concentration which is as high as possible. This allows for more energy content to be stored in the same volume, which is beneficial considering that vehicles are often limited in storage space. Even if storage space is available, for example on large ships, it may be preferred to use this storage space for storage of goods other than fuel.

According to the first aspect, however, a vehicle is provided in which the diluted fuel is stored in the fuel reservoir instead of the concentrated fuel. In particular embodiments of the vehicle, the vehicle does not comprise a fuel reservoir for storing concentrated fuel.

A fuel reservoir may be defined as a storage volume for long time storage of fuel. Long time implies that conduits for transportation of fuel, for example from a $H_2O_2$ purifier to a $H_2O_2$ holding tank, are not considered to be a fuel reservoir. For example, a fuel reservoir, for example for a car, may be arranged to hold five litres or more, ten litres or more, 20 litres or more, 30 litres or more, 50 litres or more or even 100 litres or more. For larger vehicles, such as busses, trucks, and ships, a fuel reservoir may be arranged to hold 100 litres or more, 1.000 litres or more, 10.000 litres or more, or even 100.000 litres or more.

A vehicle according to the first aspect is envisioned wherein the fuel reservoir comprises liquid diluted fuel, for example at least five litres, at least 50 litres or at least 75 litres of diluted fuel. In embodiments, such a vehicle may comprise less than ten litres, less than 2 litres, or even less than half a litre of concentrated fuel, as preferably the concentrated fuel is made on demand. This prevents having to store a large volume of concentrated fuel with the safety risks associated with storing large volumes of concentrated fuel. A small buffer of concentrated fuel may however be present, for example only in use of the vehicle, to be able to provide sufficient power at all times when using the vehicle. Such a buffer may be as small as a couple of tens or hundreds of millilitres at any given point in time.

As an option, the vehicle may comprise a conduit and an optional pump to transfer any concentrated fuel into the fuel reservoir, such that the concentrated fuel becomes diluted in the diluted fuel. For example when the vehicle is shut-off, and for example parked, concentrated fuel present may be discarded into the fuel reservoir to prevent having a vehicle with concentrated fuel stored therein, which may be a safety risk.

For example, to resupply the vehicle with fuel, diluted fuel has to be provided to the fuel reservoir. Hence, a method is envisioned for refuelling a vehicle, in particular a vehicle according to the first aspect, comprising filling at least part of the fuel reservoir with diluted fuel. Furthermore, a fuel station is envisioned comprising a supply reservoir comprising a large volume of diluted fuel, which large volume may for example be sufficient for a plurality of fuel reservoirs of vehicles according to the first aspect. The fuel station further comprises a pumping module to transport the diluted fuel from the supply reservoir to the fuel reservoir of the vehicle. Preferably, the fuel station does not comprise a storage for concentrated fuel, and hence preferably the fuel station does not comprise concentrated fuel.

As a further option for vehicles according to the first aspect, the vehicle is arranged to operate with only or substantially only the diluted fuel as a power source. Hence, no other fuels such fossil fuels, hydrogen, and/or any other fuel may be required to operate the vehicle. Hybrid vehicles power which use a combination of the diluted fuel and a battery for providing electrical energy are envisioned however. For example, the battery may be used for starting the vehicle and for a first distance while concentrated fuel is created from the diluted fuel when no concentrated fuel is stored in the vehicle when the vehicle is not in use.

The fuel densifier may be arranged to separate the dilutor from the concentrated fuel in the diluted fuel, the concentrated fuel having a first energy density and the dilutor having a second energy density being lower than the first energy density.

The fuel densifier may comprise a filter to separate the dilutor from the concentrated fuel in the diluted fuel.

The filter may comprise a filter container having a first filter compartment and a second filter compartment, the first filter compartment being separated from the second filter compartment by a filter wall comprising a membrane arranged to pass predominantly only one of the dilutor and the concentrated fuel.

The membrane may be arranged to separate a substance comprising water as the dilutor from the concentrated fuel in the diluted fuel.

The membrane may have one or both of a hydrophobic and a porous characteristic.

In embodiments of the vehicle, the vehicle further comprises a pressure control system to provide a pressure difference between a first pressure in the first compartment and second pressure in the second compartment.

The pressure control system may comprise a low pressure generator operationally connected to the second compartment.

In embodiments of the vehicle, the vehicle further comprises a temperature control module for providing a temperature difference between the first compartment and the second compartment.

The temperature control module may comprise at least one of a heater for heating a first of the first compartment and the second compartment, and a cooler for cooling a second of the first compartment and the second compartment.

The fuel densifier may comprise at least one of:
a distillation module arranged to separate the dilutor from the concentrated fuel in the diluted fuel by means of distillation;
a crystallization module arranged to separate the dilutor from the concentrated fuel in the diluted fuel by means of crystallization;
a rectification module arranged to separate the dilutor from the concentrated fuel in the diluted fuel by means of rectification;
an adsorption module arranged to separate the dilutor from the concentrated fuel in the diluted fuel by means of adsorption;
a siccation module arranged to separate the dilutor from the concentrated fuel in the diluted fuel by means of siccation;
a centrifugation module arranged to separate the dilutor from the concentrated fuel in the diluted fuel by means of centrifugation; and
a reverse osmosis module arranged to separate the dilutor from the concentrated fuel in the diluted fuel by means of reverse osmosis.

The power conversion module may comprise a reactor chamber arranged to create a pressurised fluid based on the concentrated fuel, a mechanical power conversion module for converting kinetic energy of the fluid to rotation of a shaft, a generator connected to the shaft for converting kinetic energy of the shaft to electrical energy, and at least one electromotor arranged for converting electrical energy from the generator to kinetic energy, and for providing this kinetic energy to the drivetrain.

In embodiments of the vehicle, the propulsion structure comprises at least of a first wheel and a second wheel, the power conversion module comprises a first electromotor and a second electromotor, and the drivetrain comprises a first axle connecting the first electromotor to the first wheel and a second axle connecting the second electromotor to the second wheel.

The power conversion module may comprise a mechanical engine, comprising a fuel controller arranged to control an amount of concentrated fuel provided to the mechanical engine, at least one expansion chamber expandable upon the concentrated fuel reacting to form a pressurised fluid, a chamber delimiter arranged to move upon the concentrated fuel reacting to form the pressurised fluid, and a crank shaft connected to the chamber delimiter and arranged to rotate upon movement of the chamber delimiter, wherein the crank shaft is connectable to a drive train or a generator.

In an embodiment of the vehicle, the vehicle comprises a secondary fuel reservoir for receiving and storing a secondary fuel, and a conduit connecting the secondary fuel reservoir to the reactor chamber and for providing the secondary fuel to the reactor chamber for reaction with the concentrated fuel.

The power conversion module may comprise a fuel cell for converting the concentrated fuel to electrical energy.

In embodiments of the vehicle, the power conversion module may be arranged to operate with the concentrated fuel and the power conversion module may comprise a catalyst material arranged to stimulate a reaction of the concentrated fuel into a pressurised fluid.

The concentrated fuel may be hydrogen peroxide and the dilutor may be water or another suitable solvent. The concentrated fuel may be high-test peroxide.

In embodiments of the vehicle, the vehicle may comprise a pre-filter arranged to filter impurities from the diluted fuel.

The usage of $H_2O_2$ as a fuel is particularly attractive, due to the absence of CO2 emissions when used for power generation according to the invention described. The described invention may result in products that are mainly water steam and oxygen. Moreover, recently, new methods for $H_2O_2$ production are being investigated that can allow the generation of abundant amounts of $H_2O_2$ fuel from regenerative energy sources and from the abundant available sea-water, then serving as a so-called 'solar fuel', as described in Kentaro Mase, Masaki Yoneda, Yusuke Yamada, Shunizi Fukuzumi, "Seawater usable for production and consumption of hydrogen peroxide as a solar fuel", 4 May 2016, Nature Communication, DOI:10.1038/ncomms11470. The present invention can also and in particular be used to increase the density of a fuel that is produced by this method.

This present invention relates to the provision of high energy density fuel that is made from a lower energy density fuel in solution with a second substance, that is increased in energy density in-vehicle or on land and then provided to the vehicle for vehicle power.

Another aspect of the invention may be one not implemented in a vehicle, but rather as a stationary system for converting chemical energy provided by a liquid diluted fuel the system comprising: a fuel reservoir for receiving and storing a liquid diluted fuel comprising a dilutor, a fuel densifier arranged to provide a concentrated fuel based on the diluted fuel, the concentrated fuel having a higher energy density than the diluted fuel, and a power conversion module arranged to convert the concentrated fuel to kinetic energy and arranged to provide the kinetic energy to a generator arranged to convert the kinetic energy into electrical energy.

BRIEF DESCRIPTION OF THE DRAWINGS

The various aspects and implementations thereof will now be discussed in further detail. In the Figures.

DETAILED DESCRIPTION

Figure 1:
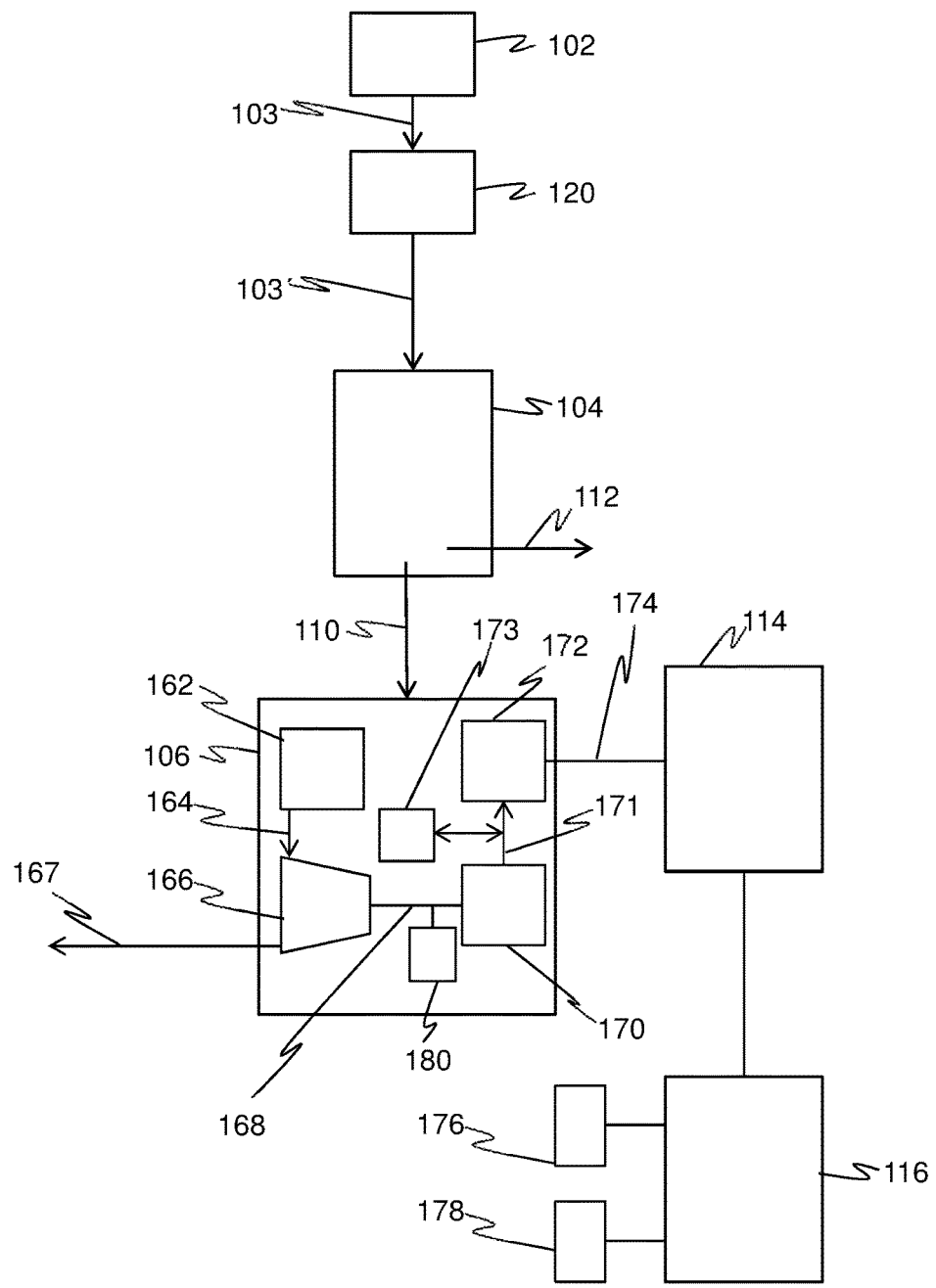
FIG. 1: shows a systematic view of a vehicle 100, comprising a fuel conversion system.

FIG. 1 shows a systematic view of a vehicle 100, comprising a fuel reservoir 102 provided for receiving and storing a volume of hydrogen peroxide ($H_2O_2$) dissolved in water as a liquid diluted fuel. The diluted $H_2O_2$ is diluted to a certain concentration, which may for example be in the range between 35% and 50% by weight (% wt), lower than 35% wt, more preferable in a range between 30% and 35%, even more preferably lower than 30%, and for example higher than 10%. Alternatively, the diluted $H_2O_2$ may be diluted to a concentration lower than 60%, lower than 50% or lower than 40%.

Alternatively or additionally, $H_2O_2$ may be dissolved in another solvent, such as acetic acid, acetone, benzene, ethanol, methanol, heptane, isopropylalcohol or any other suitable solvent, or any combination thereof.

In use, the fuel reservoir 102 of the vehicle 100 may be at least partially filled up at a filling station with the diluted $H_2O_2$ as the liquid diluted fuel. This diluted $H_2O_2$ may be diluted up to a level that is easy and safe for storage, which may furthermore be easily transportable. The diluted $H_2O_2$ may also be more safe to handle by an ordinary end-user filling up the fuel reservoir 102 before driving to his destination, compared to a less diluted and thus more highly concentrated form of $H_2O_2$.

A stabilisation agent may be added to the diluted fuel comprising the diluted $H_2O_2$. Examples of stabilisation agents which may be used are tin in soluble form, colloidal stammate, sodium pyrophosphate, other organo phosphates, nitrates, colloidal silicates, nitrilo trimethylene phosphoric acids and its alkali and ammonium salts, sodium stannate, sodium stannate trihydrate, nitric acids, any other acids inert to $H_2O_2$ and potentially inert alkalis to $H_2O_2$, any other stabilisation agent, or any combination thereof known by people skilled in the art. Methods for stabilization of diluted $H_2O_2$ are described for instance in Glenn T. Carnine, Kenmore, N.Y., and Leonard R. Darbee, Trenton N.Y., U.S. Pat. No. 3,383,174.

A stabilisation agent may be required because diluted $H_2O_2$ is generally less stable than highly concentrated $H_2O_2$ because the solvent itself (i.e. water) often adds significant amounts of impurities (containing Fe, Cr, Mn, etc. ions) that can cause decomposition of the $H_2O_2$. The stabilisation agent allows the $H_2O_2$ to be diluted down safely, despite the solvent potentially containing large amounts of impurities.

As an alternative to using a solvent with impurities and a stabilisation agent, deionised or distilled water may be used as a solvent. $H_2O_2$ diluted therein may be referred to as electronics grade $H_2O_2$ solutions with high purity, but is costly to produce.

The vehicle 100 further comprises a fuel densifier 104 arranged to provide a fluid with a higher concentration of $H_2O_2$ than that of the diluted $H_2O_2$ as contained in the fuel reservoir 102 as a concentrated fuel based on the diluted fuel.

The higher concentration may be any concentration higher than that of the diluted fuel, including $H_2O_2$ without any water anymore. As such, the less diluted $H_2O_2$ as a concentrated fuel has a higher energy density than the more diluted $H_2O_2$ as the diluted fuel. The concentrated fuel may be a high test peroxide (HTP), with a concentration higher than 50%, preferably higher than 70%, even more preferably higher than 90%, or even more preferably as high as 98%, 99% or substantially close to 100% wt.

An energy density may be defined as the amount of energy stored in a certain volume or mass of the liquid fuel. The mass or volume in this definition is independent from mass or volume associated with suspended macroscopic or microscopic impurities and particles (e.g. macroscopic particles, solid particles, dirt, etc.) that are easily filtered out from a fuel, for instance with a fuel filter. As such, an energy density of the fuel in a certain volume may be expressed as an amount of Joules per metre cubed (J/m^3), and an energy density in a certain mass may be expressed as an amount of Joules per kilogram (J/kg). As a certain amount of energy is required for moving a vehicle from one point to another, using a fuel with a higher energy density may decrease the mass of the fuel required to cover the distance from the one point to the other, and/or decrease the volume of fuel that needs to be stored to cover the distance from the one point to the other.

A vehicle may, for example, travel a distance using a first volume of fuel of a first energy density, and may the same vehicle travel the same distance using a second volume of fuel of a second energy density, wherein the second volume is halve of the first volume and the second energy density is double the first energy density.

A fuel densifier 104 is to be understood as a device arranged to receive a fuel with a first energy density, and to output a fuel with a second energy density, which is higher than the first energy density. Of course, no energy can be generated by the fuel densifier 104. Instead, the fuel is processed such that a component in the fuel with a lower energy density is separated from a component having a higher energy density and removed. This leads to an increase in the energy density of the remaining fuel from which the part with the lower energy density has been removed.

This separation of fuel from solvent can be performed in principle by any currently known separation method that is suitable to separate the $H_2O_2$ from its $H_2O$ or other solvent. Also, multiple fuel densifiers 104 can be used in series or in parallel, or both, instead of using only one single-stage fuel densifier, with each densifier then likely having slightly different arrangements, such as to more optimally separate the liquid constituents at that stage.

Before the flow of diluted fuel 103 is provided to the fuel densifier 104, it may be passed through an optional pre-filter 120 arranged to filter impurities from the flow of diluted fuel 103 for purification. Having passed through the pre-filter 120, the flow of diluted fuel 103 becomes a flow of pre-filtered diluted fuel 103'. Examples of impurities which the pre-filter 103 may filter from the flow of diluted fuel 103 are macroscopic impurities as well as other microscopic or ionic impurities, such as ions of iron, chromium, manganese, as well as the added stabilizing molecules, other, or a combination thereof. Also the pre-filter 120 can be arranged either as a single-stage filter or in multiple stages, in which multiple pre-filter 120 are arranged in series or in parallel and also with each stage optionally being arranged differently, such as to more optimally purify the fraction of fuel passing through the relevant stage. Additionally, e.g. after vehicle nominal operation, the impurities may be re-injected into the unfiltered diluted fuel 103 in order to improve the filter operation.

In embodiments of the vehicle 100 without the pre-filter 120 the flow of diluted fuel 103 is provided to the fuel densifier 104 instead of the flow of filtered diluted fuel 103'. For such embodiments, this description should be read as if the flow of filtered diluted fuel 103' is the flow of diluted fuel 103. This applies to other optional elements as well.

The fuel densifier 104 is thus directly or indirectly via the pre-filter 120 connected to the fuel reservoir 102, such that a flow of liquid diluted fuel 103 can be provided to the fuel densifier 104 from the fuel reservoir 102. To that end, a pumping device may be provided between the fuel reservoir 102 and the fuel densifier 104. Alternatively or additionally, gravity and/or a pressure difference between liquid diluted fuel in the fuel reservoir 102 and the fuel densifier 104 may be used for transporting liquid diluted fuel from the fuel reservoir 102 to the fuel densifier 104. For example may the first liquid fuel be stored under a pressure higher than an ambient pressure in the fuel reservoir 102.

In the embodiment of the vehicle as shown in FIG. 1, the fuel densifier 104 is arranged to separate a concentrated fuel 110 from a dilutor 112 out of the flow of diluted fuel 103. When the diluted fuel is $H_2O_2$ dissolved in water and therewith diluted, the concentrated fuel 110 comprises concentrated $H_2O_2$ and the dilutor 112 comprises water. As such, the water as the dilutor 112 has a lower energy density than the concentrated $H_2O_2$ as the concentrated fuel 110. Furthermore, the concentrated $H_2O_2$ has a higher energy density than the diluted $H_2O_2$ as the diluted fuel. Furthermore, the difference in energy density between the diluted fuel and the concentrated fuel, may be larger than 5%, larger than 10%, preferably larger than 20%, more preferable larger than 30%, even more preferably larger than 40%, or may be even larger.

The $H_2O_2$ as the concentrated fuel 110 may be provided to a power conversion unit 106 as the concentrated fuel. The dilutor 112 may be discarded from the vehicle if safe and allowable, or may be reused for a different purpose or may be stored for later use.

The flow of fuel 103 or filtered fuel 103' may be lead multiple times through the fuel densifier 104 or alternatively flow through multiple fuel densifiers 104 arranged in stages, that could be connected in series or in parallel or in a combination thereof, before reaching a sufficiently high $H_2O_2$ concentration in order to provide the concentrated fuel 110 to a power conversion unit 106. Each of the stages of the fuel densifier 104 could make use of a different densification technique.

The power conversion module 106 comprised by the vehicle 100 is arranged to convert the concentrated $H_2O_2$ as concentrated fuel, and more specifically the chemical energy comprised by the highly concentrated $H_2O_2$, to energy of another form, such as kinetic energy, potential energy, thermal energy and/or electrical energy.

Between the fuel densifier 104 and the power conversion module 106, a buffer may be provided for storing an amount of the concentrated fuel 110. This may be required when there is a mismatch in the amount of the concentrated fuel 110 desired by the power conversion unit 106 and delivered by the fuel densifier 104. If the fuel densifier 104 delivers more of the concentrated fuel 110 than the power conversion unit 106 can handle at a certain point in time, this excess may be temporarily stored in the buffer. If the fuel densifier 104 can not provide sufficient amount of the concentrated fuel 110, some of the stored concentrated fuel 110 may be drained from the buffer such that a sufficient amount can be provided to the power conversion module 106. This storage and retrieval function may be controlled by either pumps or also by a pressure difference and pressure distribution system with valves between the various vehicle components.

The power conversion module 106 comprises a reactor chamber 162 arranged to create a pressurised fluid based on the concentrated fuel 110 as the concentrated fuel. The pressurised fluid is outputted by the reactor chamber 162 as a flow of pressurised fluid 164. The flow of pressurised fluid 164 may comprise steam at a certain temperature and oxygen, which are a result of the operation which has taken place in the reactor chamber 162. A more detailed description of the reactor chamber 162 will be provided in conjunction with FIG. 3.

The power conversion module 106 in the embodiment of the vehicle 100 as shown in FIG. 1 further comprises a turbine 166 as a mechanical power conversion module, arranged to receive the flow of pressurised fluid 164 from the reactor chamber 162. The turbine 166 may be a steam turbine when the flow of pressurised fluid 164 comprises steam. After the steam has passed through the turbine 166, it may be discarded either in liquid state, gas state, or a combination thereof, through an exhaust 167, or, alternatively or additionally, a condenser. The turbine will also be arranged with other systems required for turbine operation.

When steam is used for powering the turbine 166, the turbine 166 and in particular a shaft thereof may be coupled to wheels of the vehicle 100 for moving the vehicle, either directly or via a drivetrain that may comprise a gearbox and other necessary and known components (i.e. breaks, clutches, gearboxes, shafts, etc.). Alternatively, in the embodiment of the vehicle 100 as shown in FIG. 1, the turbine 166 is coupled to a generator 170, which is arranged for generating electricity. Such an arrangement may have the advantage in that it allows a constant operation of the turbine 166 at an optimal or close to optimal working-point by adjusting the flow-rate of fuel into the reactor chamber 162. This may lead to overall higher efficiency of the system when it operates at constant and optimal working points.

The turbine 166 is thus rotated by virtue of the flow of pressurised fluid 164, and the turbine 166 is connected via a shaft 168 to a generator 170 arranged for converting kinetic energy of the shaft 168 to electrical energy. The power conversion module 106 further comprises in this embodiment at least one electromotor 172 arranged to receive a flow of electrical energy 171 from the generator 170, and to convert this flow of electrical energy 171 into kinetic energy to be provided to a drive train 114 of the vehicle 100. The transfer of kinetic energy from the electromotor 172 to the drive train 114 is indicated with reference numeral 174 in FIG. 1. Alternatively, the at least one electromotor 172 arranged to receive a flow of electrical energy 171 could be directly coupled to a propulsion structure, as explained further below.

Connected to turbine 166 and/or the generator 170, for example at the shaft 168, is an optional starter device 180. The starter device 180 may be used to start the rotation of the turbine 166 and/or the generator 170, and may be embodied as an electromotor.

The turbine shaft 168 may contain other equipment, such as e.g. rotary pumps or fans that can then make use of the shafts kinetic energy to perform other work (e.g. pump a liquid, apply pressure, cool a system) as required to more optimally operate the overall vehicle system 100.

The flow of electrical energy 171 may be a direct flow of electrical energy, in the form of a DC or AC current, or may be an indirect flow. An indirect flow implies that there is some kind of electrical energy storage device between the generator 170 and the electromotor 172, arranged to temporarily store or buffer electrical energy provided by the generator 170 before this energy is transferred to the electromotor 172. Examples of an electrical energy storage device are a battery 173, a battery pack, a capacitor, a super-capacitor, any other device arranged to store electrical energy or any combination thereof.

A combination of a direct flow and an indirect flow of electrical energy between the generator 170 and the electromotor 172 is in this embodiment envisioned as well. For example, if an energy demand of the electromotor 172 is lower than the energy provided by the generator 170, the excess energy is stored into the battery 173. If the energy demand of the electromotor 172 is higher than the energy provided by the generator 170, additional energy may be supplied by the battery 173. If the electromotor 172 itself generates electrical energy (for instance during energy recuperation or breaking of the vehicle), then this excess energy may be stored into the battery 173 as well.

Additionally or as an alternative to the reactor chamber 162, the turbine 166 and the generator 171, the power conversion module 106 may comprise a fuel cell (not shown) for converting the concentrated fuel to electrical energy directly. Such a fuel cell may for example be arranged either as a normal proton exchange membrane (PEM) fuel cell with $H_2O_2$ as oxidiser or as a direct fuel cell using $H_2O_2$ as an oxidant with either borohydride, metals, methanol, hydrazine or other fuels as a fuel, as described e.g. in Shunichi Fukuzumi, Yusuke Yamada, "Thermal and Photocatalytic Production of Hydrogen Peroxide and its Use in Hydrogen Peroxide Fuel Cells", Aust. J. Chem. 2014, 67, 354-364, DOI 10.1071/CH13436. Any other configuration of a $H_2O_2$-based fuel cell may be used to generate electric power as well.

As yet another addition or alternative, the power conversion module 106 is arranged to operate with the concentrated fuel 110 comprising a catalyst material arranged to stimulate a reaction of the concentrated fuel 110 into a pressurised fluid.

The power conversion module 106 may comprise a mechanical engine comprising a fuel control arranged to control an amount of concentrated fuel provided to the mechanical engine. Such an embodiment of the power conversion module 106 further comprises at least one expansion chamber such as a cylinder expandable upon the concentrated fuel reacting to form the pressurised fluid, a chamber delimiter such as a piston arranged to move upon the concentrated fuel reacting to form the pressurised fluid and a crank shaft connected to the chamber delimiter and arranged to rotate upon movement of the chamber delimiter, the crank shaft being connected to the drive train. As such, the chemical energy from the concentrated $H_2O_2$ as the concentrated fuel is directly converted into mechanical or kinetic energy for moving the vehicle.

In the case of a mechanical engine replacing the components of the power conversion module 106 shown in FIG. 1, then, also a mixture of the $H_2O_2$ with another currently known fuel such as petrol or gasoline or others would be possible.

The mechanical engine may thus be embodied as an internal combustion engine, such as a Wankel or rotary engine, radial or star engine, piston engine, gas turbine or any other type of internal combustion engine. The concentrated $H_2O_2$ reacts either upon contact with a catalyst or with a secondary fuel to mechanical energy.

In an embodiment of a Wankel engine as the mechanical engine, preferably all three chambers of the engine would be used to inject the concentrated $H_2O_2$ in a way such that the injection and reaction times result in smooth running of the circular Wankel engine. Injection timing may be controlled electronically and be based on process parameters of the engine, which are well known by a person skilled in the art.

The mechanical engine might constitute the power conversion module 106 itself as described above, or it might constitute a component inside the power conversion module 106, for instance replacing only the reactor 162 and the turbine 166. In this case, the mechanical engine will power a generator 170 and the other already described components above without changing the scope of the invention.

Alternatively, the invention could be embodied with multiple mechanical engines of either one of the types described above that would each receive the concentrated fuel 110 and potentially a secondary fuel and transfer their generated kinetic energy 174 to each wheel of a vehicle directly (wheel-hub based propulsion) then each via either a drivetrain 114 or via a propulsion structure 116. In such a case, e.g. four mechanical rotary engines could be located inside four wheels for a four-wheel drive vehicle. In this case, the power conversion module would exist four times inside the vehicle 100.

The secondary fuel may be any other type of fuel, such as LNG or Diesel, and is applied as a bi-propellant together with the concentrated $H_2O_2$.

The drive train 114 of the vehicle 100 is arranged to transfer the kinetic energy 174 from the power conversion module 106 to a propulsion structure 116. The drive train 114 may comprise components such as gears, differentials, brakes, any other drive train components known to a person skilled in the art, or any combination thereof. The propulsion structure 116 may comprise wheels, axles, differentials, any other vehicle components, or any combination thereof.

The propulsion structure could also be e.g. a propeller or a screw in the case of the vehicle being a ship, vessel or submergible/submarine vehicle or an aerial vehicle that uses a rotor of any form.

In the particular embodiment of the vehicle 100 as shown in FIG. 1, the propulsion structure 116 comprises a first wheel 176 and a second wheel 178. Both wheels are arranged to couple the vehicle 100 to a road surface, such that when the wheels are rotated, the vehicle 100 moves relative to the road surface. Although the power conversion module 106 is shown in FIG. 1 comprising a single electromotor 172, embodiments of the vehicle 100 are envisioned wherein the power conversion module 106 comprises a plurality of electromotors, which plurality may correspond to or supersede the number of wheels comprised by the vehicle. Any such motor could also be directly coupled to the propulsion structure 116.

Figure 2:
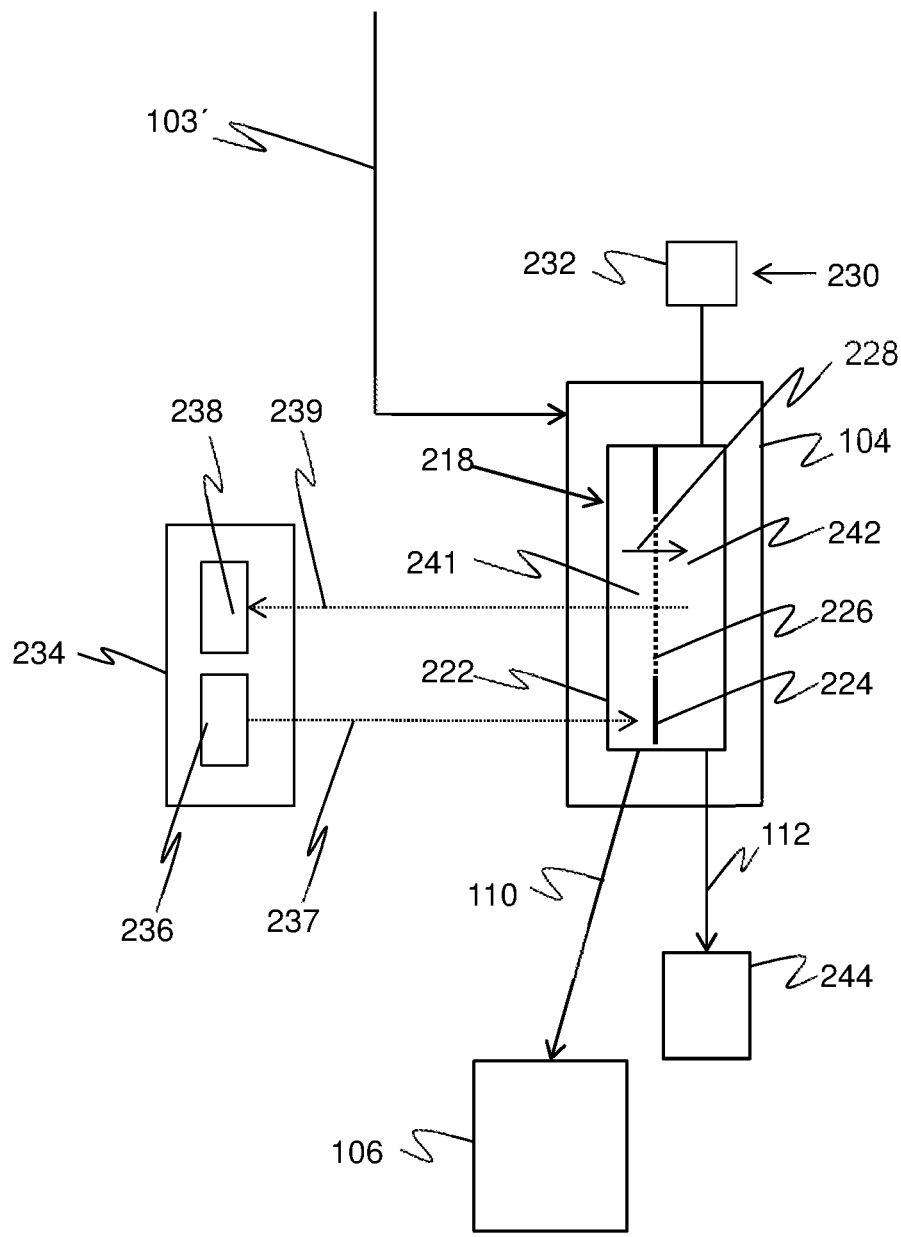
FIG. 2: shows an implementation embodiment of a fuel densifier.

FIG. 2 shows a particular embodiment of a fuel densifier 104 which may be used in the vehicle 100 of FIG. 1 or in any other embodiment of the vehicle 100. The fuel densifier of FIG. 2 is provided with a filter 218 for separating the concentrated fuel 110 of the flow of filtered diluted fuel 103' from the dilutor 112 of the flow of filtered diluted fuel 103'. The filter 218 comprises a filter container 222 having a first filter compartment 241 separated from a second filter compartment 242 by a filter wall 224 comprising a membrane 226 arranged to allow passage of predominantly only one of the concentrated fuel 110 and the dilutor 112.

The filter container 222 can be made of macroscopic material or be alternatively also realized as a micro-mechanical (i.e. MEMS) system.

In an embodiment of a fuel densifier 104, the membrane 226 is arranged to separate a substance comprising water as the dilutor 112 from the flow of filtered diluted fuel 103' by pervaporation. The fuel-densifier may be arranged as a vacuum membrane distillation unit, for which a porous membrane with hydrophobic characteristic may be used in a thermally driven pervaporation process.

This flow of the substance comprising water as the dilutor 112 is indicated with an arrow referenced to with reference numeral 228.

In embodiments of the fuel densifier 104, the membrane 226 has a hydrophobic characteristic (e.g. with a single hydrophobic layer or with a composite porous tri-layer (hydrophobic/hydrophilic/hydrophobic). The membrane 226 is in a preferred embodiment porous, and may comprise polytetrafluorethylene (PTFE), polypropylene (PP) or polyvinylidene fluoride (PVDF) or any other polymer currently known to be suitable for membrane distillation. Membrane distillation here may be understood as a membrane separation process that is based on a thermally driven transport of vapour through a suitable non-wetting membrane that prevents liquid solutions from entering and wetting its pores but allows water vapour to pass through the membrane and to then condensate after passage.

The second compartment 242 may be arranged for any membrane separation and distillation process, including but not limited to direct contact membrane distillation, vacuum membrane distillation, Air Gap Membrane Distillation, Sweeping Gas Membrane Distillation, Thermostatic Sweeping Gas Membrane Distillation without changing the principle of the membrane separation process described by FIG. 2.

Optionally provided is a pressure control system 230 arranged to provide a pressure difference between a first pressure in the first compartment 241 and second pressure in the second compartment 242. In the embodiment of FIG. 2, as an example, the pressure control system 230 comprises a low pressure generator 232 operationally connected to the second compartment 242. In an alternative embodiment, the pressure control system 230 is arranged for manipulating the pressure in one or both of the first compartment 241 and the second compartment 242. Depending on the pervaporation process used for separating the concentrated fuel 110 from the dilutor 112, a positive or negative pressure difference may be desired between the first filter compartment 241 and the second filter compartment 242. In a preferred embodiment, the pressure in the second filter compartment 242 will be lower than the pressure in the first filter compartment 241, in order to result to a vacuum membrane distillation arrangement.

As an option, the embodiment of the fuel densifier 104 of FIG. 2 further comprises a temperature control module 234 for providing a temperature difference between the first compartment 241 and the second compartment 242. In the embodiment of FIG. 2, the temperature control module 234 comprises a heater 236 for heating the first compartment 241 as a first of the first compartment 241 and the second compartment 242, and a cooler 238 for cooling the second compartment 242 as a second of the first compartment 241 and the second compartment 242.

The heater 236 is arranged in the embodiment of FIG. 2 for providing thermal energy in a heater flow 237 to the first compartment 241, and the cooler 238 is arranged for extracting thermal energy in a cooler flow 239 from the second compartment 242. The heater flow 237 and the cooler flow 239 may be constituted by conduction, convection, radiation, and/or a combination thereof. Furthermore may, as an option, the heater 236 comprise a heat pump and/or the cooler 238 comprise a refrigerator.

By virtue of the heater flow 237, the temperature or at least the amount of thermal energy in the first compartment 241 may increase. By virtue of the cooler flow 239, the temperature or at least the amount of thermal energy in the second compartment 242 may decrease.

In alternative embodiments of the fuel densifier 104 may the heater 236, and with it the heat flow 237, be arranged for heating the second compartment 242 and the cooler 238, and with it the cooler flow 239, be arranged for cooling the first compartment 241. Furthermore are embodiments of the fuel densifier 104 envisioned wherein the temperature control module 234 comprises only one of the heater 236 and the cooler 236, and as such may only one of the heat flow 237 and the cooler flow 239 be provided to only one of the first compartment 241 and the second compartment 242.

As a further option shown in FIG. 2, a vacuum device 244 as a low pressure device is provided, which is connected to the flow of dilutor 112 flowing out of the second filter compartment 242. The vacuum device 244 is arranged to constitute a flow of water (or any of the other solvents) as the dilutor 112 or can be stored in or ejected from the vehicle out of the second filter compartment 242.

Additionally or alternatively, a high pressure source like a compressor is provided as a pressure control module. An outlet of the compressor may be connected to the inlet of the filter 218 and the inlet of the first filter compartment 241 in particular, for instance via a pressure regulator.

In other embodiments of the fuel densifier 104, the membrane 226 and chambers 241 and 242 can be arranged for any of known separation membrane distillation processes, including but not limited to direct contact membrane distillation, vacuum membrane distillation, Air Gap Membrane Distillation, Sweeping Gas Membrane Distillation, Thermostatic Sweeping Gas Membrane Distillation without changing the principle of the membrane separation process described by FIG. 2.

Such processes and associated arrangements are well known and described in many books, e.g. in Mohamed Khayet and Takeshi Matsuura, "Membrane Distillation Principles and Applications", Book, Elsevier, ISBN: 9780444531261 or also, albeit with different naming in Ahmad Fauzi Ismail, Mukhlis A. Rahman, Mohd Hafiz Dzarfan Othan, Takeshi Matsuura, Editors; Colin F. Poole, Series Editor, "Membrane Separation Principles and Applications, From Material Selection to Mechanisms and Industrial uses", Book, Elsevier, 2018, ISBN: 978-0-12-812815-2. Another potential process that can be applied to the fuel densifier 104 is the known process of Membrane Osmotic Distillation or a combination of membrane distillation with the known osmotic distillation.

The physical embodiments of the fuel densifier 104, can vary from known arrangements such as plate-and-frame modules, or tubular, or fiber or spiral wound modules such as described on e.g. pages 8-12 in Charis M. Galanakis, "Separation of Functional Molecules in Food by Membrane Technology", Elsevier, ISBN: 978-0-12-815056-6.

Moreover, embodiments of the fuel densifier 104 could make use of a MEMS (micro-electro mechanical system) based module that consists of wafer stacks and suitable membranes and hollow channels that are assembled in a plate- and frame module similar to the ones described above, in order to provide multiple channel and membrane transitions in a small volume.

In alternative embodiments of the vehicle 100, the fuel densifier 104 is arranged differently than as shown in FIG. 2.

For example may the fuel densifier 104 comprise a distillation module known to a person skilled in the art, arranged to separate a concentrated fuel from a dilutor of the diluted fuel by means of distillation. An apparatus of such an embodiment could be for instance any known standard equipment for distillation or rectification, such as a distillation column, rotary evaporators, or any other distillation equipment that is known to a person skilled in the art.

In another embodiment, the membrane distillation filter described schematically in FIG. 2, will be implemented in a MEMS device with multiple chambers 241 and 242 arranged in a stack of wafer material with micro-channels separated by one or multiple membranes 242 that are then inserted in a suitable filter container.

In another embodiment, the fuel densifier 104 comprises a crystallization module arranged to separate the concentrated fuel from the dilutor in the diluted fuel by means of crystallization, for instance by freezing, by precipitation from a solution or gas phase or similar to the process described in Stefan Nordhoff, Matthias Creutz, Stefan Gross, Rudolf Wagner, "US Patent 2002/0068035 A1, 2002" and or by means of multiple-stage re-crystallization as described in the Book "Hydrogen Peroxide" by Walter C. Schumb (1955).

In yet another embodiment, the fuel densifier 104 comprises a rectification module arranged to separate the concentrated fuel from the dilutor in the diluted fuel by means of osmotic rectification, which can also be called osmotic distillation.

In an even further embodiment, the fuel densifier 104 comprises an adsorption module arranged to separate the concentrated fuel from the dilutor in the diluted fuel by means of adsorption to a surface consisting of a water adsorbent material, such as the carbon adsorbents described in the review provided by Lumeng Liu, Shiliang Tan, Toshihide Horikawa, D. D. Do, D. Nicholson, Junjie Liu, "Water adsorption on carbon—A review", Advances in Colloid and Interface Science 250 (2017), pp. 64-78 or for example by the silica material reported by Hertl, Hair, "Adsorption of Water on Silica", Nature, Vol. 223, Sep. 13, 1969.

In yet a further embodiment, the fuel densifier 104 comprises a siccation module arranged to separate the concentrated fuel from the dilutor in the diluted fuel by means of siccation. This can lead to high purities and concentrations of $H_2O_2$ if deemed necessary and can follow a freeze drying process or a process similar to the one described by K. V. Titova, V. P. Nikol'skaya, V. V. Buyanov, I. P. Suprun, "Methods for Concentration of hydrogen peroxide to obtain it in anhydrous form", Russian Journal of Applied Chemistry, Vol 75, No. 12, 2002, pp. 1903-1906. This process will deliver high purity $H_2O_2$ then in anhydrous form.

In yet an even further embodiment, the fuel densifier comprises a centrifugation module arranged to separate the solution constituents with a centrifugal force by separating respective particles with different densities. This embodiment can comprise a cyclonic module that separates particles through a centrifugal and gravity force, such as in the known vortex separation process.

In yet an even further embodiment, the fuel densifier comprises a reverse osmosis module arranged to separate the solution constituents with a mechanical pressure force by reverse osmosis principle.

Furthermore are embodiments of the vehicle 100 envisioned comprising a fuel densifier 104 comprising a combination or multiple of any of the modules and/or other components mentioned in this description for separating the concentrated fuel 110 from the dilutor 112 in the diluted fuel.

The preferred embodiment of the fuel densifier 104 described in FIG. 2, based on pervaporation with a membrane distillation technique may be preferred over other non-distillation based methods, since it has multiple advantages for the purpose of this invention. A densification based on membrane distillation under vacuum allows to at least one of:
  concentrate the fuel 'in-line' at a suitable concentration rate and flow-rate that is practical for in-vehicle usage and conversion inside a reactor chamber;
  concentrate the $H_2O_2$ fuel by distillation under vacuum, which lowers the risk of self decomposition during pervaporation of the $H_2O_2$ when the sample is heated (due to the reduced boiling-point of the $H_2O_2$ and water under vacuum);
  embody the fuel densifier 104 in a practical hardware arrangement that can be mechanically robust and sufficiently compact and small for integration in a vehicle, e.g. when a stack design or a tubular design is chosen in which suitable membranes and channels are packed at a highly compact volume either horizontally or rolled as described above;

when repeated in series, it is easily anticipated that the membrane-distillation embodiment allows to increase the concentration of $H_2O_2$ in the fuel from a low concentration of equal to or below 50% up to 90% wt or higher at sufficiently large quantities in the amounts of time required that allow efficient propulsion of the vehicle;

Avoid fouling of the membrane, which occurs with pressure driven processes, when particles are deposited on a membrane surface or on its pores and then lead to reduction in permeability.

Before passing the concentrated fuel to a power conversion module, the fuel passes through an optional pre-filter 120, which can remove impurities and other non-desired ionic or molecular content of the fuel solution as mentioned above. The pre-filter can make use of membrane filtration, if deemed necessary also in multiple stages to filter-out constituents that range from macroscopic (millimetres) to atomic scale (nano-meters). A micro-filtration can be included that will remove particulates, and colloids of typically 0.05-10 micrometers in diameter in a pressure driven process.

Moreover, the pre-filter 120 can contain an electrodialysis filtration stage, in which ionic species can be removed by an electrical force that forces ions (e.g. iron, salts, stabilizers, other) across one or multiple ion exchange membranes, such as shown e.g. on page 269 in [Galanakis 2019], which can be adequate to remove constituents that could otherwise lead to uncontrolled (catalytic) decomposition of the $H_2O_2$.

After being separated from the flow of filtered diluted fuel 103', the concentrated fuel 110 is provided to the power conversion module 106.

Figure 3:
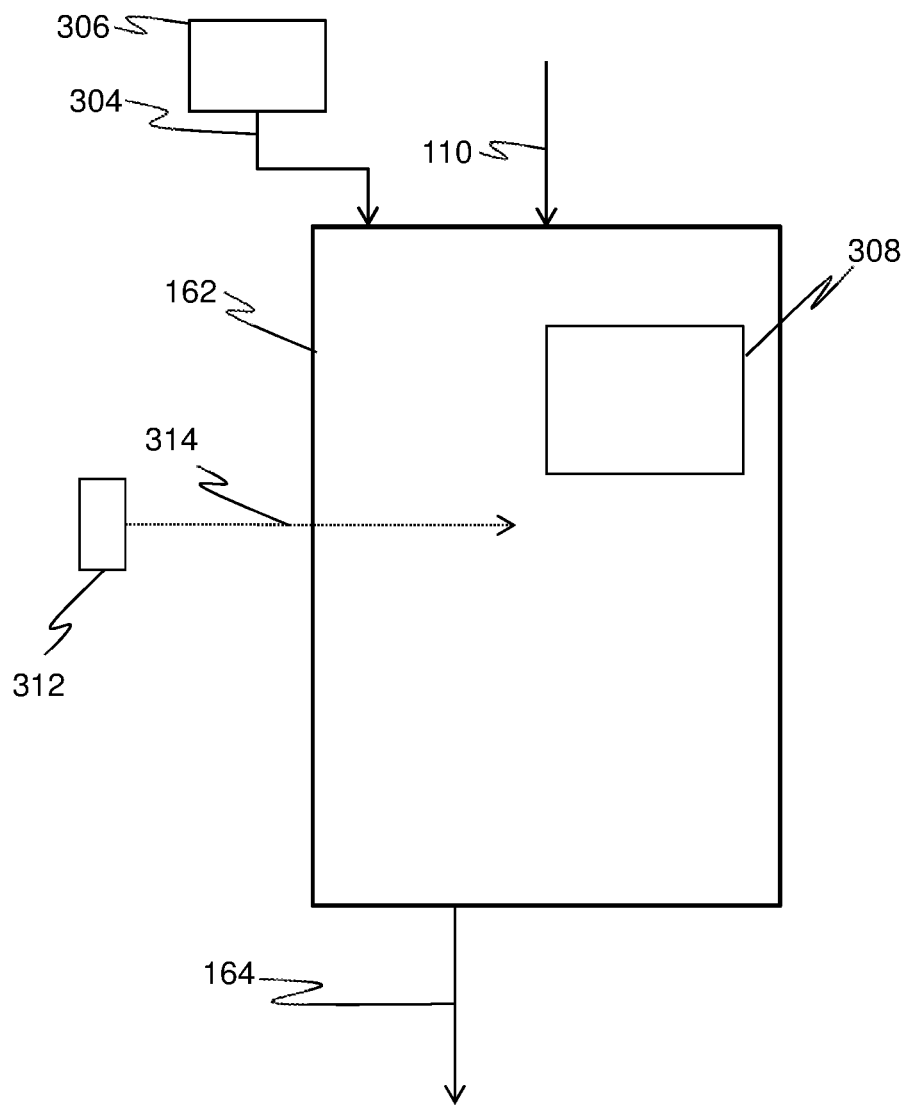
FIG. 3: shows an implementation of the reactor chamber.

FIG. 3 shows a schematic overview of part of an embodiment of a vehicle 100, focused on the reactor chamber 162 comprised by an embodiment of the power conversion unit 106.

The reactor chamber 162 is arranged to receive concentrated $H_2O_2$ as the concentrated fuel 110 supplied by the fuel densifier 104. In the reactor chamber 162, chemical energy from the concentrated $H_2O_2$ is to be converted into another form of energy, which may be used to move the vehicle 100 (typically converted first to thermal energy and then to kinetic and then to electric energy).

The concentrated $H_2O_2$, in a preferred embodiment of the invention, may be applied onto a solid catalyst material, which causes the $H_2O_2$ to rapidly decompose into reaction products, which are water, steam and oxygen combined as a pressurised fluid. The catalyst can be any suitable solid material, such as e.g. silver, or platinum catalyst mesh, or e.g. manganese dioxide spherules or any other suitable liquid (e.g. organic) catalyst material, such as to form a mono-propellant reaction converting the $H_2O_2$ to steam and oxygen. Alternatively or additionally, the concentrated $H_2O_2$ can be mixed with a secondary fuel, such as hydrazine, monomethylhydrazine or other suitable fuels known to an expert skilled in the art, in order to let the $H_2O_2$ act as an oxidizer, which also leads to a reaction (bi-propellant reaction) and leads to the release of steam and other by-products as a flow of pressurised fluid. The reaction products are outputted from the reactor chamber 162 as the flow of pressurised fluid 164. The flow of pressurised flow 164 may comprise material in a gas state, liquid state, or a mixture thereof.

As an optional feature, which is shown in the embodiment of FIG. 3, the vehicle 100 comprises a secondary fuel reservoir 306, arranged for receiving and storing an amount of secondary fuel for a bi-propellant reaction with the second fuel. A secondary fuel conduit 304 is provided connecting the secondary fuel reservoir 306 to the reactor chamber 162 and for providing the secondary fuel to the reactor chamber 162 for reaction with the concentrated fuel. The secondary fuel reservoir 306 may be pressurised, and/or a pumping device may be provided to the conduit 304 to constitute the flow of secondary fuel from the secondary fuel reservoir 306 to the reactor chamber 162 or alternatively a low- or under-pressure extraction may be used to extract the secondary fuel from the secondary fuel reservoir 306.

The secondary fuel can act as a reducing agent in reaction with the concentrated $H_2O_2$. With $H_2O_2$ as the primary fuel, a bi-propellant reaction may be constituted in the reactor chamber 162, e.g. when the secondary fuel comprises dinitrogen tetroxide, hydrazine, kerosene or other currently known material, which may act as a reactant with $H_2O_2$.

Examples of a secondary fuel, which may be used in conjunction with $H_2O_2$ are hydrazine, ethanol or any other reactant that acts as fuel or reducing agent or also substances to ensure long-life of the catalyst (e.g. electron donors) that is optionally available inside the reactor chamber 162 when used with a secondary fuel.

Next to, or as an alternative to adding a secondary fuel into the reactor chamber 162, a catalyst may be added. To this end, the vehicle 100 as shown in FIG. 3 comprises a catalyst reservoir 308 arranged for receiving and storing an amount of catalyst material. By supplying the flow of concentrated fuel 110 to the catalyst reservoir 308 to the reactor chamber 162, a reaction of the concentrated fuel into pressurised fluid may be stimulated. The catalyst reservoir may be pressurized and the catalyst can be removed from the catalyst reservoir 308 by a pump. In the case of a solid catalyst feed, a mechanical feed provision and mechanism may be provided.

Examples of catalyst which may be used are silver, manganese dioxide, platinum, organic matter, any other material arranged for starting, sustaining, or otherwisely manipulating a reaction in the reactor chamber 162, or any combination thereof. Also liquid catalysts may be re-provided from the catalyst reservoir, such as for example calcium permanganate mixed with water.

The embodiment as shown in FIG. 3 further comprises an optional reactor chamber heater 312, which is arranged to provide thermal energy as a reactor chamber heat flow 314 to the reactor chamber 162 or to the catalyst reservoir 308, which may be embodied as a solid catalyst bed, or at least a part thereof. The thermal energy may aid in starting, sustaining, or otherwisely manipulating the reaction in the reactor chamber 162 and the heat may be directly applied to the catalyst material provided to the reaction chamber 162 in order to pre-heat it.

Summarizing, the reactor chamber 162 receives concentrated $H_2O_2$ as a concentrated fuel originating from the concentrated fuel 110 as separated from the diluted fuel in the fuel densifier 104. The reactor chamber 162 is arranged to allow conversion of the concentrated $H_2O_2$ into steam as a pressurised fluid upon contact with a solid catalyst bed. Optionally and or alternatively, for example for increasing the efficiency and/or energy output of the reactor chamber, one or both of a secondary fuel and a catalyst may be added.

Any of the components of the vehicle 100 arranged to have a flow of fluid, liquid, gas or any other flow there through may be provided with one or more valves with which the flow rate through such a component can be controlled. Furthermore may any of the reservoirs arranged for holding a fluid be pressurised in order to constitute a flow of fluid out of the reservoir. The vehicle 100 then comprises a control system for controlling the valves, and therewith controlling the flow rate of the different flows within the vehicle 100.

A vehicle 100 may be provided with a vehicle control system arranged to control different actuatable components of the vehicle 100, such as pumps, valves, gearboxes, heaters, coolers, any other component comprised by the vehicle 100 or any combination thereof.

A vehicle 100 may be provided with a vehicle control system arranged to measure different properties related to any of the components of the vehicle 100, such as to optimize the control of the vehicle, measurements being of temperature, flow-rate, velocity, mass-flow, shaft speeds and positions, electrical voltage and or current or any other measurement required for operating any of the components of the vehicle 100 or any combination thereof.

The vehicle control system may be arranged for receiving a user input, and actuate one or more of the actuatable components according to the user input. A user input may for example be provided by a user operating a throttle pedal of the vehicle. Such a user input may cause the vehicle control system to increase certain flow rates, such as a fuel flow rate or a flow of electrical energy to an electrical motor.

The vehicle control system may further comprise one or more sensors, arranged to provide a sensor signal to the vehicle control system. The vehicle control system may then actuate one or more of the actuatable components according to one or more of the sensor signals, optionally together with the user input. For example may a sensor signal relate to a vehicle speed, temperature, pressure, any other relevant parameter, or any combination thereof.

In summary, for powering a vehicle, a high energy density fuel is preferred. However, for example when the high energy fuel is highly concentrated hydrogen peroxide, this fuel may be dangerous to handle; especially when the person handling the fuel is a normal consumer filling a fuel reservoir of his vehicle at a gas station. The present invention therefore provides a vehicle arranged to receive a diluted—and thus safer—fuel, and to densify this fuel to a concentrated fuel in low quantities on board for direct use. To this end a fuel densifier is provided in the vehicle arranged for receiving liquid diluted fuel and arranged to provide a concentrated fuel based on the diluted fuel, the concentrated fuel having a higher energy density than the diluted fuel. A power conversion module of the vehicle is arranged to convert the concentrated fuel to kinetic energy for powering the vehicle.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described.

The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

What is claimed is:

1. A vehicle, comprising:
   a fuel reservoir for receiving and storing a liquid diluted fuel comprising a dilutor;
   a fuel densifier arranged for receiving liquid diluted fuel from the fuel reservoir and arranged to provide a concentrated fuel based on the diluted fuel, the concentrated fuel having a higher energy density than the diluted fuel;
   a power conversion module arranged to convert the concentrated fuel to kinetic energy;
   a propulsion structure for propelling the vehicle; and
   a drive train to transfer the kinetic energy from the power conversion module to the propulsion structure;
   wherein the fuel densifier comprises a filter to separate the dilutor from the concentrated fuel in the diluted fuel, the concentrated fuel having a first energy density and the dilutor having a second energy density being lower than the first energy density; and
   the filter comprises a filter container having a first filter compartment and a second filter compartment, the first filter compartment being separated from the second filter compartment by a filter wall comprising a membrane arranged to pass predominantly only one of the dilutor and the concentrated fuel.

2. The vehicle according to claim 1, wherein the membrane is arranged to separate a substance comprising water as the dilutor from the concentrated fuel in the diluted fuel.

3. The vehicle according to claim 1, wherein the membrane has a hydrophobic characteristic.

4. The vehicle according to claim 1, wherein the membrane has a porous characteristic.

5. The vehicle according to claim 1, further comprising a pressure control system to provide a pressure difference between a first pressure in the first compartment and second pressure in the second compartment.

6. The vehicle according to claim 5, wherein the pressure control system comprises a low pressure generator operationally connected to the second compartment.

7. The vehicle according to claim 1, further comprising a temperature control module for providing a temperature difference between the first compartment and the second compartment.

8. The vehicle according to claim 7, wherein the temperature control module comprises at least one of:

a heater for heating a first of the first compartment and the second compartment; and a cooler for cooling a second of the first compartment and the second compartment.

9. The vehicle according to claim 1, wherein the fuel densifier comprises at least one of:
   a distillation module arranged to separate the dilutor from the concentrated fuel in the diluted fuel by means of distillation;
   a crystallization module arranged to separate the dilutor from the concentrated fuel in the diluted fuel by means of crystallization;
   a rectification module arranged to separate the dilutor from the concentrated fuel in the diluted fuel by means of rectification;
   an adsorption module arranged to separate the dilutor from the concentrated fuel in the diluted fuel by means of adsorption;
   a siccation module arranged to separate the dilutor from the concentrated fuel in the diluted fuel by means of siccation;
   a centrifugation module arranged to separate the dilutor from the concentrated fuel in the diluted fuel by means of centrifugation; and
   a reverse osmosis module arranged to separate the dilutor from the concentrated fuel in the diluted fuel by means of reverse osmosis.

10. The vehicle according to claim 1, wherein the power conversion module comprises:
   a reactor chamber arranged to create a pressurised fluid based on the concentrated fuel;
   a mechanical power conversion module for converting kinetic energy of the fluid to rotation of a shaft;
   a generator connected to the shaft for converting kinetic energy of the shaft to electrical energy; and
   at least one electromotor arranged for converting electrical energy from the generator to kinetic energy, and for providing this kinetic energy to the drivetrain
   a secondary fuel reservoir for receiving and storing a secondary fuel; and
   a conduit connecting the secondary fuel reservoir to the reactor chamber and for providing the secondary fuel to the reactor chamber for reaction with the concentrated fuel.

11. The vehicle according to claim 1, wherein the power conversion module comprises a fuel cell for converting the concentrated fuel to electrical energy.

12. The vehicle according to claim 1, wherein the power conversion module is arranged to operate with the concentrated fuel and the power conversion module comprises a catalyst material arranged to stimulate a reaction of the concentrated fuel into a pressurised fluid.

13. The vehicle according to claim 12, wherein the concentrated fuel is high-test peroxide.

14. The vehicle according to claim 1, wherein the concentrated fuel is hydrogen peroxide and the dilutor is water or another suitable solvent.

15. The vehicle according to claim 1, further comprising a pre-filter arranged to filter impurities from the diluted fuel.

16. A vehicle comprising,
   a fuel reservoir for receiving and storing a liquid diluted fuel comprising a dilutor;
   a fuel densifier arranged for receiving liquid diluted fuel from the fuel reservoir and arranged to provide a concentrated fuel based on the diluted fuel, the concentrated fuel having a higher energy density than the diluted fuel;
   a power conversion module arranged to convert the concentrated fuel to kinetic energy;
   a propulsion structure for propelling the vehicle; and
   a drive train to transfer the kinetic energy from the power conversion module to the propulsion structure, wherein:
   the power conversion module comprises:
   a reactor chamber arranged to create a pressurised fluid based on the concentrated fuel;
   a mechanical power conversion module for converting kinetic energy of the fluid to rotation of a shaft;
   a generator connected to the shaft for converting kinetic energy of the shaft to electrical energy; and
   at least one electromotor arranged for converting electrical energy from the generator to kinetic energy, and for providing this kinetic energy to the drivetrain; and
   the propulsion structure comprises at least of a first wheel and a second wheel;
   the power conversion module comprises a first electromotor and a second electromotor; and
   the drivetrain comprises a first axle connecting the first electromotor to the first wheel and a second axle connecting the second electromotor to the second wheel.

17. A vehicle comprising,
   a fuel reservoir for receiving and storing a liquid diluted fuel comprising a dilutor;
   a fuel densifier arranged for receiving liquid diluted fuel from the fuel reservoir and arranged to provide a concentrated fuel based on the diluted fuel, the concentrated fuel having a higher energy density than the diluted fuel;
   a power conversion module arranged to convert the concentrated fuel to kinetic energy;
   a propulsion structure for propelling the vehicle;
   wherein the power conversion module comprises a mechanical engine, comprising:
   a fuel controller arranged to control an amount of concentrated fuel provided to the mechanical engine;
   at least one expansion chamber expandable upon the concentrated fuel reacting to form a pressurised fluid;
   a chamber delimiter arranged to move upon the concentrated fuel reacting to form the pressurised fluid; and
   a crank shaft connected to the chamber delimiter and arranged to rotate upon movement of the chamber delimiter,
wherein the crank shaft is connectable to a drive train or a generator.

* * * * *